(12) United States Patent
Kotamraju (10) Patent No.: US 11,575,678 B1
(45) Date of Patent: Feb. 7, 2023

(54) ADAPTIVE AUTHENTICATION

(71) Applicant: Wells Fargo Bank, N.A., San Francisco, CA (US)

(72) Inventor: Sridhar Kotamraju, Fremont, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 153 days.

(21) Appl. No.: 16/851,925

(22) Filed: Apr. 17, 2020

Related U.S. Application Data (63) Continuation of application No. 15/480,846, filed on Apr. 6, 2017, now Pat. No. 10,630,693, which is a continuation of application No. 14/704,457, filed on May 5, 2015, now Pat. No. 9,654,477.

(51) Int. Cl.
  *H04L 9/40* (2022.01)
  *G06F 21/31* (2013.01)

(52) U.S. Cl.
  CPC .......... *H04L 63/102* (2013.01); *G06F 21/316* (2013.01); *H04L 63/08* (2013.01); *H04L 63/105* (2013.01)

(58) Field of Classification Search
  CPC ..... H04L 63/102; H04L 63/08; H04L 63/105; G06F 21/316
  See application file for complete search history.

(56) References Cited

U.S. PATENT DOCUMENTS

| | | | |
|---|---|---|---|
| 8,584,219 B1 * | 11/2013 | Toole | H04L 63/08 726/25 |
| 8,635,117 B1 | 1/2014 | Acuna-Rohter | |
| 8,832,790 B1 | 9/2014 | Villa et al. | |
| 8,997,240 B1 * | 3/2015 | Kohen | G06F 21/31 726/26 |
| 9,122,866 B1 | 9/2015 | Kolman et al. | |
| 9,166,961 B1 * | 10/2015 | Johansson | H04L 63/102 |
| 9,300,676 B2 | 3/2016 | Madhu et al. | |
| 9,419,957 B1 * | 8/2016 | Rouse | H04L 63/10 |
| 9,426,182 B1 | 8/2016 | Zeljko et al. | |
| 9,589,118 B2 * | 3/2017 | Agarwal | G06F 21/31 |
| 9,654,477 B1 * | 5/2017 | Kotamraju | H04L 63/102 |
| 2008/0134305 A1 * | 6/2008 | Hinton | H04L 63/08 726/5 |
| 2009/0089869 A1 * | 4/2009 | Varghese | G06Q 20/4014 726/7 |
| 2010/0077457 A1 * | 3/2010 | Xu | H04L 63/08 726/4 |

(Continued)

OTHER PUBLICATIONS

Computer Desktop Encyclopedia, "Processor", A CDE Definition, The Computer Language Company, Retrieved from <http://lookup.computerlanguage.com/host_app/search?cid=C999999&term=processor&lookup.x=0&lookup.y=0 >, Accessed on Aug. 4, 2017, pp. 1-2.

*Primary Examiner* — Jason Chiang
(74) *Attorney, Agent, or Firm* — Womble Bond & Dickinson (57) ABSTRACT

Provided is adaptive authentication that utilizes relational analysis, sentiment analysis, or both relational analysis and sentiment analysis to facilitate an authentication procedure. The relational analysis evaluates a transactional profile and a behavioral profile of the user. The sentiment analysis evaluates available user information that is obtained from various forms of Internet activity related to the user. A level of authentication is selectively modified based on a result of the relational analysis and/or the sentiment analysis.

20 Claims, 8 Drawing Sheets

(56) References Cited

U.S. PATENT DOCUMENTS

| | | | |
|---|---|---|---|
| 2010/0100950 A1* | 4/2010 | Roberts | H04L 63/08 726/7 |
| 2011/0099602 A1 | 4/2011 | Apparao et al. | |
| 2011/0225625 A1* | 9/2011 | Wolfson | G06F 21/32 726/1 |
| 2011/0314558 A1* | 12/2011 | Song | G06F 21/316 726/28 |
| 2012/0159647 A1* | 6/2012 | Sanin | H04L 51/32 726/28 |
| 2012/0323717 A1* | 12/2012 | Kirsch | G06F 21/31 705/26.1 |
| 2013/0007864 A1* | 1/2013 | Puflea | G06F 21/33 726/7 |
| 2013/0174239 A1* | 7/2013 | Kim | H04L 63/205 726/7 |
| 2013/0232543 A1* | 9/2013 | Cheng | H04L 9/14 726/1 |
| 2013/0269013 A1* | 10/2013 | Parry | H04L 63/107 726/7 |
| 2013/0311737 A1 | 11/2013 | Shaw et al. | |
| 2014/0143149 A1* | 5/2014 | Aissi | G06F 21/629 705/44 |
| 2014/0208419 A1* | 7/2014 | Chang | G06F 21/31 726/21 |
| 2014/0282977 A1* | 9/2014 | Madhu | G06Q 50/265 726/7 |
| 2014/0337945 A1 | 11/2014 | Jia et al. | |
| 2014/0366128 A1 | 12/2014 | Venkateswaran et al. | |
| 2015/0059003 A1* | 2/2015 | Bouse | G06F 16/2379 726/28 |
| 2015/0128240 A1* | 5/2015 | Richards | H04L 63/0861 726/7 |
| 2015/0142595 A1* | 5/2015 | Acuna-Rohter | G06Q 30/06 705/21 |
| 2015/0193774 A1 | 7/2015 | Wetzel | |
| 2017/0093920 A1* | 3/2017 | Ducatel | H04L 63/08 |

* cited by examiner

ADAPTIVE AUTHENTICATION

This application is a continuation of U.S. patent application Ser. No. 15/480,846, filed Apr. 6, 2017, and entitled "ADAPTIVE AUTHENTICATION," which is a continuation of U.S. patent application Ser. No. 14/704,457, filed on May 5, 2015, and entitled "ADAPTIVE AUTHENTICATION". The entireties of the above-noted applications are incorporated by reference herein.

BACKGROUND

Authentication is the process of determining whether a person is the actual person they are asserting themselves to be. A common type of authentication is based on logon passwords or other credentials. As it relates to financial institutions, for example, a customer may access and transact with one or more of the customer's financial institution(s) accounts through a variety of channels. As non-limiting examples, a customer's physical credit card may be used to make purchases at a point of sale and/or a credit card number may be used to make purchases online. In other examples, the customer's account information may be accessed and viewed through a financial institution website, the customer may manage an account through a telephone interaction, and so on. Although these options provide increased access and convenience for the customer, each of these channels also provide opportunities for fraudulent access. On the user side, an occurrence of fraud (e.g., compromised financial data, monetary loss, identity theft, and so on) as well as the need to provide authentication information (e.g., enter a temporary pass code or one time password) have been blamed for user dissatisfaction. On the network side, malware that operates to intercept the temporary pass code or one-time password makes it increasingly difficult to authenticate devices and users associated with the devices with a high degree of confidence.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

One general aspect includes a system. The system comprises a processor coupled to a memory that includes instructions that when executed by the processor cause the processor to: infer expected context associated with user identity based on mining of social network data in response to a request to interact with a secure resource, compare current context with the expected context, determine an authentication level based on a result of the compare, and selectively permit access to the secure resource based on a result of authentication at the authentication level.

Another general aspect includes a method. The method also comprises inferring expected context associated with user identity from analysis of social network data in response to a request to interact with a secure resource; comparing current context with the expected context, determining an authentication level based on a result of the comparing, and selectively permitting access to the secure resource based on a result of authentication at the authentication level. Other embodiments of this aspect include corresponding computer systems, apparatus, and computer programs recorded on one or more computer storage devices, each configured to perform the actions of the methods.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Figure 1:
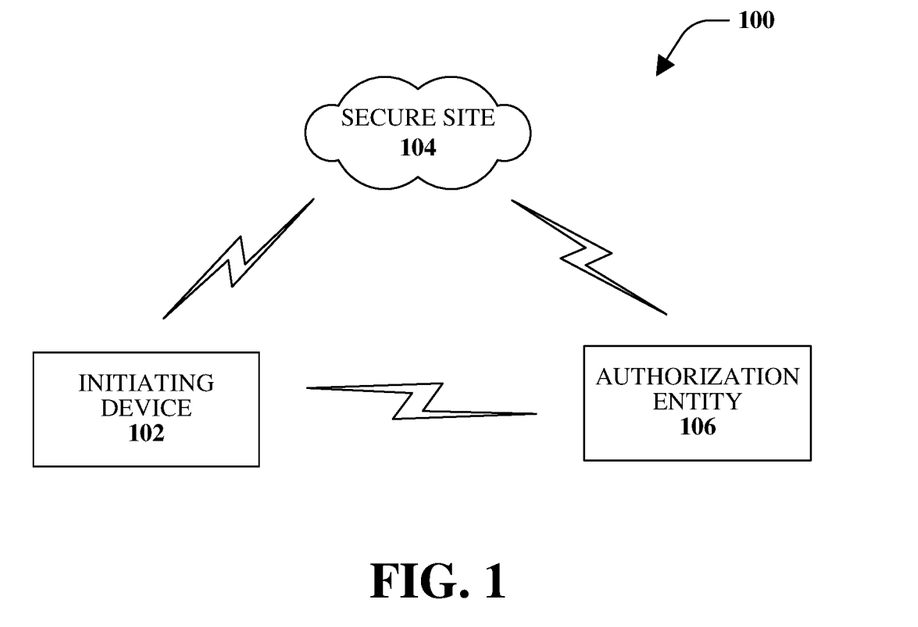
FIG. 1 illustrates an example, non-limiting representation of a communications environment in which the disclosed aspects may be utilized.

FIG. 1 illustrates an example, non-limiting representation of a communications environment 100 in which the disclosed aspects may be utilized. Authentication of a user on a website, such as a financial institution website, may take a risk-based approach to determining the type and level of authentication that should be utilized for the interaction. For example, if the user is accessing a system from a known location and/or a known device, the level of authentication may be lighter than the authentication that would be needed if the user access the system from a new location or from an unknown device. According to an implementation, the user's activity on the Internet is taken into consideration when a determination is made related to a risk level associated with an authentication attempt. In an example, the user's browsing history, login history, cookies, and other Internet browsing related information may be analyzed to determine the user's sentiment and behavior when accessing the Internet. Further, the various forms of data may be analyzed to determine the user's sentiment as the behavior relates to a financial institution or other entity. Additionally, or alternatively, the user's Internet use information may be used to determine other websites on which the user has been authenticated. Further, the user's risk areas may be identified based on the Internet information and the user may be provided an option to adjust security choices (e.g., authentication type) when accessing their accounts to mitigate the identified risks.

With continuing reference to FIG. 1, the communications environment 100 includes an initiating device 102 that is attempting to perform one or more interactions within a secure site 104. The initiating device 102 may be a communication device (e.g., desktop computer, laptop computer, smart phone, and so on). The secure site 104 may be a network associated with an entity, for example. As used herein an "entity" refers to a financial institution, such as a bank, persons operating on behalf of the financial institution, and/or communication devices managed by the financial institution and/or the persons operating on behalf of the financial institution. Additionally, or alternatively, the entity may be a third-party monitoring source, security provider, or another type of entity that has a trusted relationship with the financial institution.

Also illustrated in the environment 100 is an authorization entity 106. Although illustrated as separate from the secure site 104, according to some implementations, the authorization entity 106 may be communicatively coupled to the secure site 104. For example, the authorization entity 106 may be a trusted third party that performs authorization functions on behalf of the secure site 104 (e.g., an entity associated with the secure network). In another example, the secure site 104 may be configured to perform the authorization functions (e.g., the authorization entity 106 is included in the secure site 104).

According to various aspects disclosed herein, enhanced adaptive authentication is performed in real-time. The enhanced adaptive authentication may include real-time relational analysis, real-time sentiment analysis, or both real-time relational analysis and real-time sentiment analysis. The enhanced adaptive authentication may be applied when a user (e.g., through the initiating device 102) attempts to log in to access a website or other secure site 104, such as a financial institution website, from an unrecognized device or location. The enhanced adaptive authentication may also be applied when a user (or the initiating device 102) is attempting to log in through an unrecognized or suspicious Internet Protocol (IP) address, such as, for example, when the user is making an out of band log in attempt. In another example, the adaptive authentication may be applied based on user preferences, preferences of the secure site, or other considerations.

The various aspects disclosed herein extend beyond traditional systems that deploy a risk-based approach for authentication of users. The various aspects disclosed herein consider the risk, not just from a limited data source controlled by a single entity, instead the various aspects perform real time data mining. The data mining may extract key logic-based risk elements. Further systemic methodologies may be applied to identify a "relational and relative risk" of the user. Further, identified risks for users with certain parameters may be identified.

According to some implementations, the user may be provided the choice to dynamically adjust the security choices when accessing their accounts. The requested adjustment of the risk settings may be systemically consumed by risk monitoring systems, which may apply relevant policies to authenticate the user at the correct authentication level.

According to an implementation, a user logs into an online banking website (e.g., in a desktop environment). The user initiates a non-monetary interaction or a monetary interaction. For a non-monetary interaction, the user may be updating his profile information (e.g., address, phone number, and so on), changing features or options, and so forth. For a monetary interaction, the user may be viewing balances, transferring money, wiring money, making a purchase, or performing other financial transactions. The system 100 may make a determination based on a user's previous interaction profile and/or previous behavior profile (e.g., historical information) in comparison with the user's current transaction request or behavior to determine if the current interaction is being made by the authorized user. In another example, a public profile of a user may be mined in real-time to determine if the current activity of the user matches an expected activity based on the public profile. If there is not a match, a series of questions may be presented to the user during the authentication process.

Figure 2:
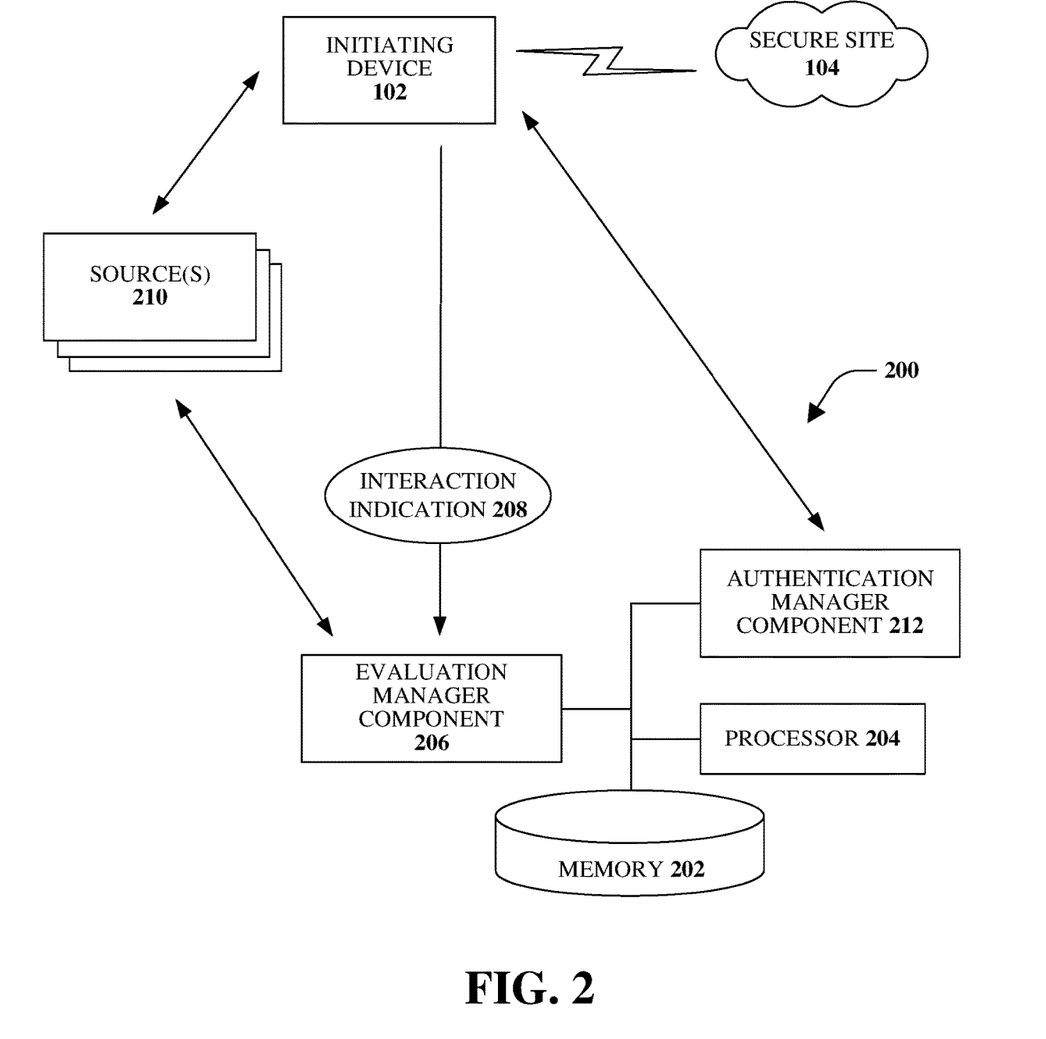
FIG. 2 illustrates an example, non-liming implementation of a system configured for adaptive authentication, according to an aspect.

FIG. 2 illustrates an example, non-limiting implementation of a system 200 configured for adaptive authentication, according to an aspect. Various aspects discussed herein provide a user defined rich based framework that allows a user to provide input and to participate in a risk identification process. The risk-based framework is an enhanced adaptive authentication. As discussed herein, enhanced adaptive authentication relates to analyzing risk factors in real time and changing (or adapting) the type of authentication based on the analysis.

The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the memory 202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 202 (e.g., operatively connected to the memory 202), the various aspects are not limited to this implementation. Instead, in accordance with various implementations, the one or more computer executable components and/or the one or more computer executable instructions may be stored in (or integrated within) the memory 202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 200 may also include an evaluation manager component 206 that, in response to an indication 208 of an attempt to perform an interaction within the secure site 104, may be configured to perform real-time analysis. The indication 208 may be received from the initiating device 102 or from the secure site 104.

The real-time analysis may be real-time relational analysis and/or real-time sentiment analysis. To perform the relational analysis, the evaluation manager component 206 may be configured to obtain, from one or more sources 210, data related to the user of the initiating device 102. For example, the one or more sources 210 may have data related to the user's online activity profile. An authentication manager component 212 may be configured to compare the user's online activity profile with a behavioral profile of the user when the user communicates with the secure site 104 (e.g., through the initiating device 102 when the attempt to perform the interaction is initiated).

For example, the evaluation manager component 206 may be configured to establish relationships with the one or more sources 210, which may be one or more databases, risk systems, or other types of sources. The relationship established may be between the user's transactional profile and the user's behavioral profile. For example, the relationship may be established within the user's online activity profile, which in on the Internet, versus the behavioral profile of the user when the user communicates with the secure site 104. The authentication manager component 212 may compare the differences between the two profiles and, if the profiles are similar, a lower level of authentication (or no further authentication) may be needed for the user to interact with the secure site 104. However, if there are differences between the two profiles, a higher level of authentication may be needed in order for the user to access the secure site 104.

To perform sentiment analysis, the evaluation manager component 206 may be configured to identify the available public information of the user activity from the one or more sources 210. At least a set of the sources used for the sentiment analysis may be the same sources used for the relational analysis, or may be different sources. The evaluation manager component 206 may be configured to mine the public information in real time. Further, the authentication manager component 212 may be configured to evaluate the public information and compare the information with current information of the user.

For example, the evaluation manager component 206 may be configured to identify the available public information of the user activity from the Internet. Additionally, or alternatively, the evaluation manager component 206 may be configured to extract information through relationships with other entities (e.g., sources 210) that have the information related to the user activity. The information may be what is occurring on the public domain of a user's social media, for example.

As indicated, the information may be mined in real time. By obtaining the information, the system 200 may be configured to identify the user's risk profile to be associated with each factor. For example, a factor may be that a user has just posted on her social media that she is traveling to a particular location or made some comments. The authentication manager component 212 may be configured to use that information in real time to make the determination whether or not the user's current activity matches what the user is posting on her social media in the public domain (or privately, provided the system 200 received prior approval to mine the non-public information). In accordance with one or more implementations, users may opt-out of providing personal information, demographic information, location information, proprietary information, sensitive information, or the like in connection with data gathering aspects.

The evaluation manager component 206 may be configured to obtain the necessary information based on receipt of the indication 208 from the initiating device 102. Alternatively, the indication 208 may be received from the secure site 104. The indication 208 provides a notice to the evaluation manager component 206 that the initiating device 102 is attempting to interact with the secure site 104. The interaction may be a non-monetary interaction (e.g., user profile, preferences, accessing forms, and so on) or a monetary interaction (e.g., viewing account balances or transactions, transferring money, wiring money, making a payment, depositing funds, and other financial transactions). The communication between the system 200 and the initiating device 102 may be an out of band communication (e.g., a communication on a different channel, or by a different method, than the channel or method of the primary communication channel).

Based on the evaluation performed by the authentication manager component 212, a level of authentication for the interaction may be modified. For example, when relational analysis is performed, the authentication level may be increased based on a determination that the transactional profile does not match the behavioral profile. Alternatively, when the transactional profile is substantially the same as the behavioral profile, the authentication level may be decreased (e.g., less or no authentication is needed).

In another example when sentiment analysis is performed, the authentication level may be increased based on a determination that the available user information does not match a current activity of the user. Alternatively, when the available user information substantially matches a current activity of the user, an authentication level may be decreased.

Figure 3:
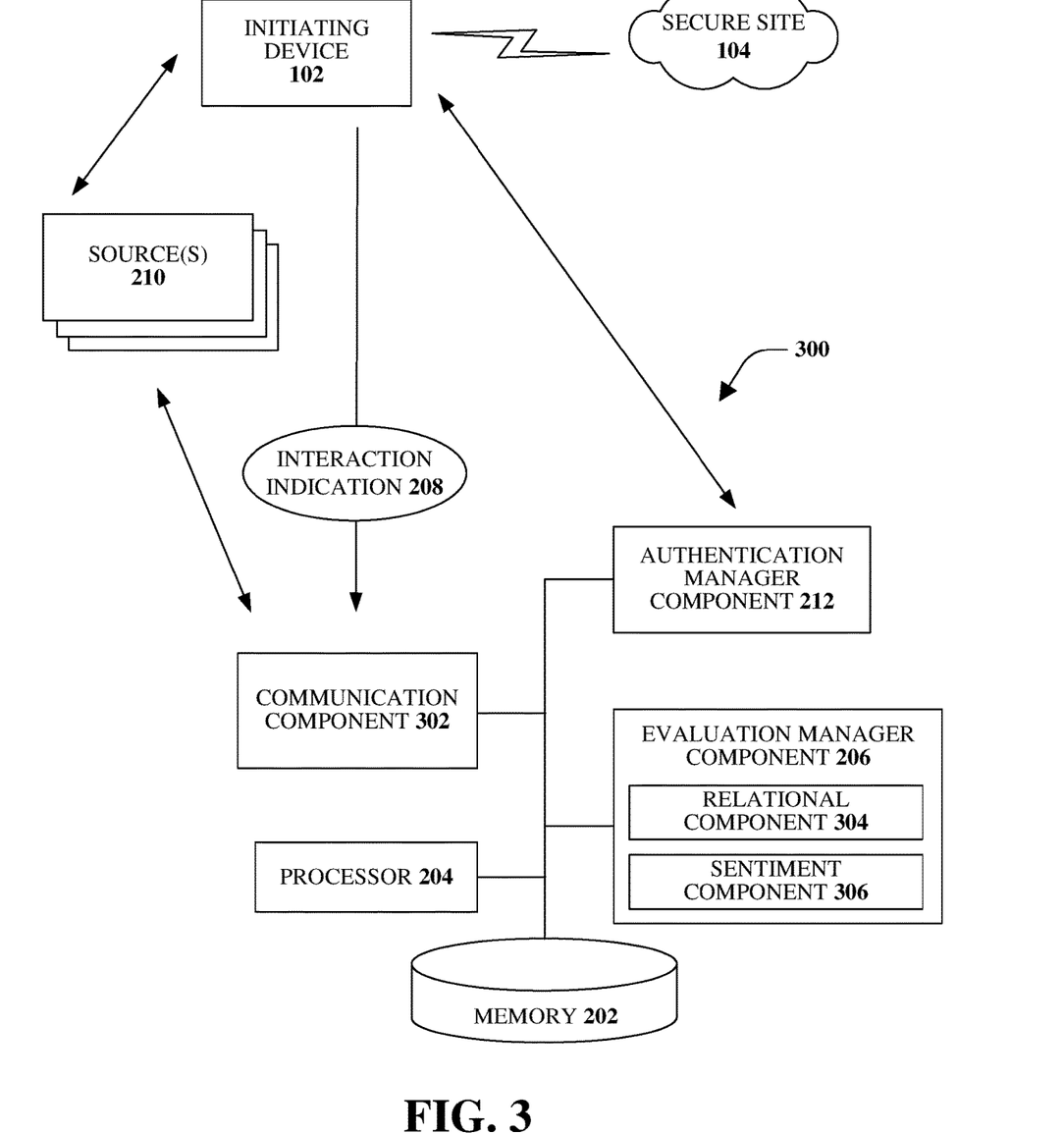
FIG. 3 illustrates another example, non-limiting system configured to provide adaptive authentication, according to an aspect.

FIG. 3 illustrates another example, non-limiting system 300 configured to provide adaptive authentication, according to an aspect. An initiating device 102 may log into a secure site 104. For example, the initiating device 102 may be authorized to access the secure site 104 based on an initial authorization. This initial authorization may include the entry of a username and password pair or other manners of signing into a website or providing credentials. However, because the correct credentials were provided and limited access to the secure site is allowed, an entity performing a subsequent interaction within the secure site might be someone other than the authorized user (e.g., man in the middle attack). A man in the middle attack occurs when a rogue entity (e.g., attacker) relays and/or alters a communication between two parties (e.g., a user associated with the initiating device 102 and the secure site 104). However, the two parties mistakenly believe they are communicating with each other.

To overcome man-in-the middle and other unauthorized access and/or interactions with the secure site 104, a communication component 302 may be configured to receive the interaction indication 208. For example, after logging into the secure site 104, the initiating device 102 (or user thereof) may attempt to perform an interaction with the secure site 104. The interaction may be a monetary transaction or a non-monetary transaction, for example. The interaction indication 208 may be received from the initiating device 102, the secure site 104, or an associated device.

Based on the interaction indication 208, a relational component 304 may be configured to access at least one source 210 to obtain data related to a user's transactional profile. Additionally, or alternatively, a sentiment component 306 may be configured to extract available public information related to the user activities and use the information to determine whether the user of the initiating device 102 is the authorized user.

For example, a user may have posted on her social media site that she will be traveling from Maine to Tennessee on October 20 and will return on October 27. On October 24, the user may have initiated an interaction with the secure site. Thus, the sentiment component 306 has the travel information from the social media site and compares the information with a current location of the user (e.g., through a global positioning system, internet protocol information, or through other manners of identifying a location of the initiating device 102). If the current location of the user, when then interaction is attempted, is indicated as Knoxville, Tenn., the expected location of the user matches the current location. Therefore, it may be inferred that the user performing the interaction is in fact the expected user. In this case, the authentication manager component 212 may have an elevated level of confidence and may decrease the level of authentication necessary to complete the interaction. In some cases, the authentication manager component 212 may determine the level of confidence is above a threshold level and, therefore, no further authentication is necessary.

However, if the current location indicates the user device is located in Oregon, it may indicate that the user attempting the transaction is not the authorized user. Alternatively, it may indicate the user has changed her travel plans. Thus, the authentication manager component 212 may have a lower level of confidence and may request a higher level of authentication. For example, one or more security questions may need to be answered correctly in order for the initiation attempt to be approved. The levels of authentication may be determined based on the level of confidence as determined by the authentication manager component 212.

According to some implementations, the evaluation manager component 206 mines the available user information from a social network associated with an identity of the user. For example, the social network may be identified based on information already known to the secure site 104. Such information may include an email alias, a telephone number, a name, an internet protocol address or other machine identity information, and other forms of data that may be uniquely associated with the user. In some implementations, a single sign-on used across multiple websites may be utilized to verify the user. The information may be known to the secure site 104 based on data provided by the user at initiation of a relationship between the user and the secure site or at a different time.

The evaluation manager component 206 may mine the social network in real-time such that after information is posted, the information is captured by the system 300 and retained, at least for a certain period of time, for later authentication purposes. The information retained may be deleted after a certain amount of time (e.g., a day, a week, a month, and so on) or based on other criteria (e.g., the information provides an indication of when an event will occur and, after the occurrence of the indicated date/time, the information is purged from the system memory).

In accordance with other implementations, the evaluation manager component 206 may obtain at least a portion of the available user information directly from the user. Thus, the user has the opportunity to present information to the system during a previous session when there was a high level of confidence that the user performing the interaction is the authorized user.

Figure 4:
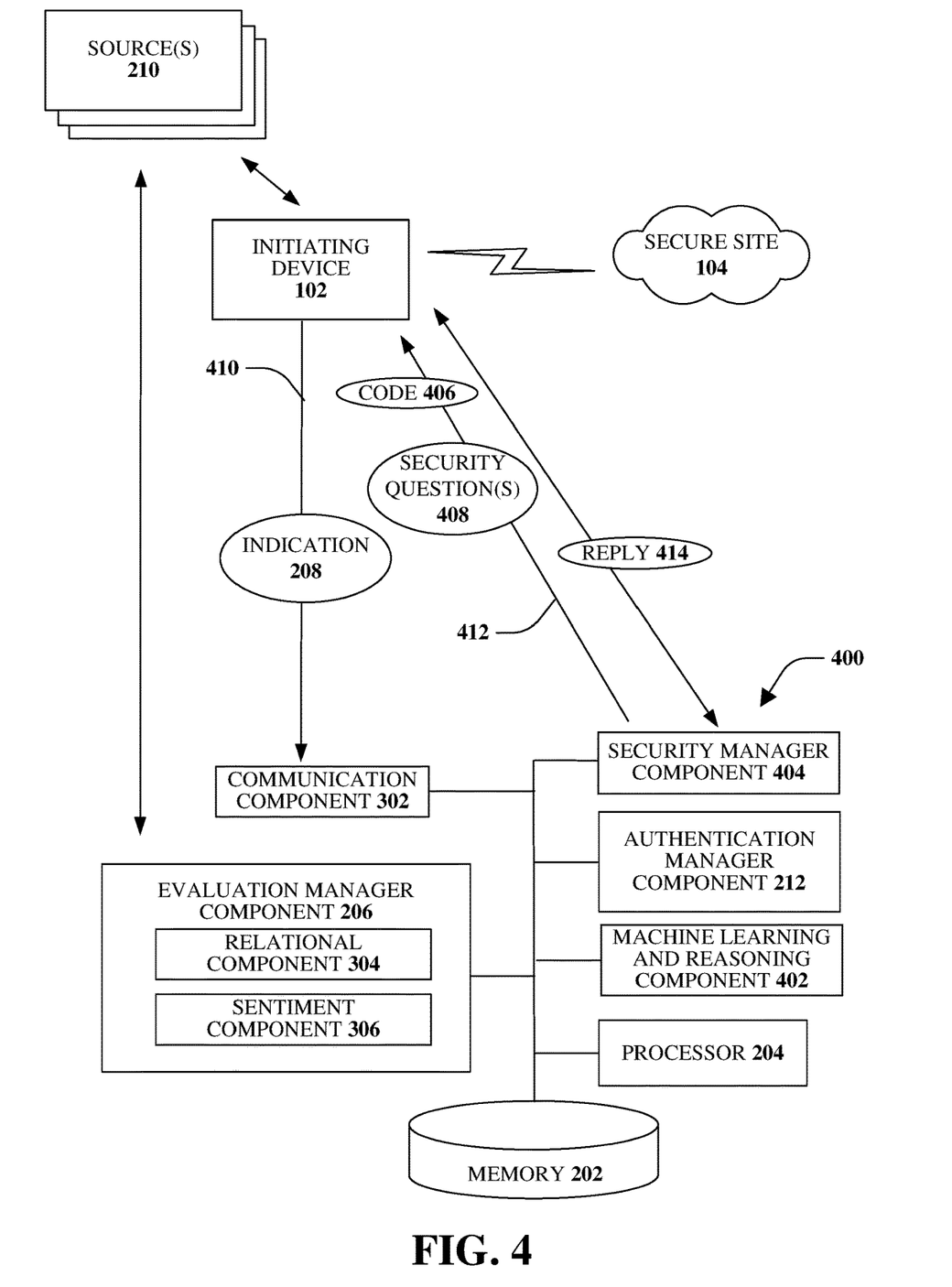
FIG. 4 illustrates another example, non-limiting system configured for enhanced adaptive authentication through real time relational and relative sentiment analysis, according to an aspect.

FIG. 4 illustrates another example, non-limiting system 400 configured for enhanced adaptive authentication through real time relational and relative sentiment analysis, according to an aspect. At about the same time as an interaction indication 208 is received from an initiating device 102, an evaluation manager component 206 may be configured to obtain known data related to an identity of a user identified in the transaction indication. The data may be previously known to the evaluation manager component 206 (e.g., obtained in real time and stored internal to system) or obtained from one or more sources 210.

A relational component 304 and/or a sentiment component 306 may be configured to evaluate the data in comparison with current data to determine if the different types of data are in conformance. For example, the determination may be that a user's current activity matches what the user was expected to be doing based on information available in a public domain of the Internet and associated with the user identity.

For example, a policy may be defined as high, medium, low, or based on other parameters (e.g., a score between 0 and 10, a rank between 0 and 100, a risk color level or score (e.g., red, yellow, green), and so on). A risk may also be assigned when the user's activity changes rapidly (or dramatically) from what is available from the public information and/or the information already known to the secure site 104.

According to some implementations, a user may be given the choice to communicate with the system 400. For example, the user, through a device, which may be the initiating device 102 or another device, may interact with the communication component 302 (or with another system component). Various information may be provided by the user, such as the user indicating her travel pattern. Thus, the user may indicate they are traveling out a town (or out of the country) and, based on this information, the risk model (e.g., the system 400) may decide not to decline the transaction in certain areas based on the user's prior communication.

Further to this implementation, user input is enabled, which allows communication back to the secure site 104. Thus, the secure site 104 is not blindly relying on information the user provides. The information is evaluated with what is determined in terms of activity around the user's sentiment profile indication. For example, the user may indicate that they will be traveling to Europe next week. The sentiment profile indicator might be reviewed and the status on a social network might have a different view, such as indicating that the user is at home (e.g., not traveling). In this case, the sentiment profile indication may be high and, therefore, the authentication manager component 212 challenges the user (e.g., with a one time passcode (OTP)), as will be discussed in further detail below. Alternatively, if there is a match, the authentication manager component 212 might not challenge the user. Thus, the authentication may be adaptive.

If the risk is at a medium level, the authentication manager component 212 might not issue an OTP. For example, the user may be traveling internationally and, therefore, might not receive the OTP. In this case, the challenge may be a question that only the user is able to answer. Thus, the challenge may be adapted depending on the sentiment analysis and/or the relational profiling factor. Information related to the challenges will be provided in more detail below.

According to some implementations, automated learning may be employed to facilitate one or more of the disclosed aspects. For example, a machine learning and reasoning component 402 may be utilized to automate one or more of the disclosed aspects. The machine learning and reasoning component 402 may employ automated learning and reasoning procedures (e.g., the use of explicitly and/or implicitly trained statistical classifiers) in connection with determining whether a user device may be authenticated for a specific transaction in accordance with one or more aspects described herein.

For example, the machine learning and reasoning component 402 may employ principles of probabilistic and decision theoretic inference. Additionally, or alternatively, the machine learning and reasoning component 402 may rely on predictive models constructed using machine learning and/or automated learning procedures. Logic-centric inference may also be employed separately or in conjunction with probabilistic methods.

The machine learning and reasoning component 402 may infer a potential for fraudulent activity or potential fraud, for example, by obtaining knowledge about various logged information, such as historical data and/or current data. The data may include transactional information, behavioral information, activity information, as well as other information associated with the user. In an example, if the trend for fraud is higher for a particular transaction type, the machine learning and reasoning component 402 may automatically require the user to take additional action to complete the authentication, which may also be reflected in a rule-based pattern. In another example, based on a confidence level that user is in fact the authorized user, the machine learning and reasoning component 402 may automatically authenticate the user and continue to authenticate the user during the entire interaction (or at least a portion of the interaction).

As used herein, the term "inference" refers generally to the process of reasoning about or inferring states of the system, a component, a module, the environment, external devices, mobile devices, and so on from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 402 has uncertainty related to the authentication of the user, the machine learning and reasoning component 402 may automatically engage in a short (or long) dialogue or interaction with the user (e.g., answer a security question, enter a temporary code, and so on). In accordance with some aspects, the machine learning and reasoning component 402 engages in the dialogue with the user through another system component and/or an external device.

The various aspects (e.g., in connection with adaptive authentication of a user at initiation of an interaction and at various times during the interaction, and so forth) may employ various artificial intelligence-based schemes for carrying out various aspects thereof. For example, a process for determining if particular current behavior, profile, and/or activity of a user matches an expected behavior, profile, and/or activity, or has an unexpected value may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine the identity of a user.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed.

Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing historical patterns related to health, geolocation, devices, and so on). For example, SVM's may be configured through a learning or training phase within a classifier constructor and feature selection module. Thus, a classifier(s) may be used to automatically learn and perform a number of functions, including but not limited to determining according to a predetermined criteria when to automatically authenticate a user (e.g., the initiating device 102), which interactions should have an additional authentication procedure, which interaction amounts should have an additional authentication procedure, and so on.

Additionally, or alternatively, an implementation scheme (e.g., a rule, a policy, and so on) may be applied to control and/or regulate when and how a user is authenticated. In some implementations, based upon a predefined criterion, the rules-based implementation may automatically and/or dynamically implement one or more rules and/or confidence levels associated with a particular authentication procedure. In response thereto, the rule-based implementation may automatically interpret and carry out functions associated with the authentication procedure by employing a predefined and/or programmed rule(s) based upon any desired criteria.

According to some implementations, based on the interaction indication 208 and the additional information, it may be determined that authentication is necessary for the current interaction. In this situation, a security manager component 404 may be configured to transmit a token code 406 and a security question 408 (or a set of security questions) to the initiating device 102.

The communication between the system 400 and the initiating device 104 may be an out of band communication (e.g., a communication on a different channel, or by a different method, than the channel or method of the primary communication channel). As used herein, the out of band communication will be referred to as different communication channels. Therefore, the indication 208 may be received over a first communications channel 410 and the code 406 and the security question(s) 408 may be transmitted over a second communications channel 412. The first communication channel 410 and the second communications channel 412 may be different channels. For example, the initiating device 102 may be a desktop computer, wherein a user has logged into the secure site 104. Therefore, the indication 208 of the transaction is received from the desktop computer. In response, the code 406 and the security question(s) 408 may be transmitted through a Short Message Service (SMS), for example.

The authorization manager component 212 may be configured to analyze a reply 414 received in response to the security question(s) 408. The reply 414 may be appended to the code 406. For example, if the reply 414 is the expected reply (and includes the code 406), the authorization manager component 212 may allow the transaction to continue. However, if the reply 414 is not the expected reply (and/or the received code is not the code 406), the transaction request is denied and/or more information is solicited from the initiating device 102.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
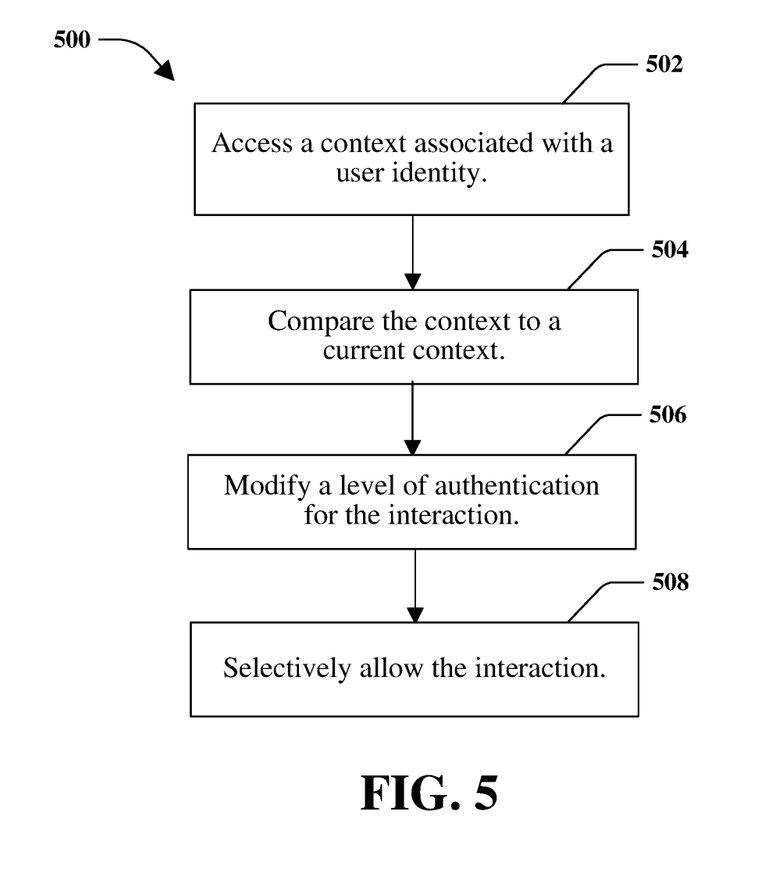
FIG. 5 illustrates an example, non-limiting method for adaptive authentication, according to an aspect.

FIG. 5 illustrates an example, non-limiting method 500 for adaptive authorization, according to an aspect. The method 500 in FIG. 5 may be implemented using, for example, any of the systems, such as the communications environment 100 (of FIG. 1). Computing devices encounter multiple risks, including malware. When an OTP or passcode is provided in response to an attempt to access a secure network, according to traditional methods, the OTP or passcode may need to be entered into an application installed on the computing device (or on another computing device). If there is malware, for example, resident on the computing device, the OTP or passcode is rendered useless because the malware may intercept the code. Thus, the computing device is still open to risk, such as a man in the middle attack.

Thus, method 500 may be configured to evaluate one or more contexts associated with the user to determine whether the user of the computing device is the expected user or whether the user does not seem to be the authenticated user. A level of authentication may be reduced if the context is as expected. Alternatively, the level of authentication may be increased if the context is not as expected or is unusual.

Method 500 starts, at 502, when a context associated with a user identity is accessed. The context may be accessed in response to a request to perform an interaction within a secure network (such as secure site 104 of FIG. 1). The context may include a profile, an activity, or both a profile and an activity. The profile may be a transactional profile, a behavioral profile, or another profile associated with a user identity. The activity may be an activity reported on a social network, an activity inferred based on a location of a user device, an activity reported by a user, or an activity determined based on information obtained from one or more sources, and so on.

The request may be received, from a user device (such as initiating device 102 of FIG. 1). The request may include an indication of an attempt to perform various types of interactions (e.g., monetary, non-monetary, and so on) with the secure network. The indication may be a request to access a portion of the secure network or to perform another function (e.g., a transaction) within the secure network.

According to an implementation, the request to initiate the interaction may be received after an identity of a user authorized to access a secure network is received and verified. For example, the identity of the user may be verified based on a received username/password pair or another means of identification or credentials (e.g., biometric identification).

At 504, the context is compared to a current context. The current context may be the context determined at substantially the same time as the request to perform the interaction is received (e.g., what is the user doing right now?). The comparison may include determining if the context and the current context are substantially the same or are different.

A level of authentication for the interaction is modified, at 506, as a result of the comparing. For example, if the context and the current context are substantially the same, the level of authentication may be minimal (e.g., only one or two security questions need to be answered) or the need for further authentication may be eliminated. Alternatively, if the context and the current context do not match, the level of authentication may be increased (e.g., a set of five security questions need to be answered, biometric identity information is needed, and so on).

At 508, the interaction may be selectively allowed based on a result of the authentication. In the case where further authentication is not needed, the interaction is automatically allowed at 508. Further, if the security questions are answered correctly, the interaction may be allowed. However, if one or more security questions are answered incorrectly, the interaction may be denied.

Figure 6:
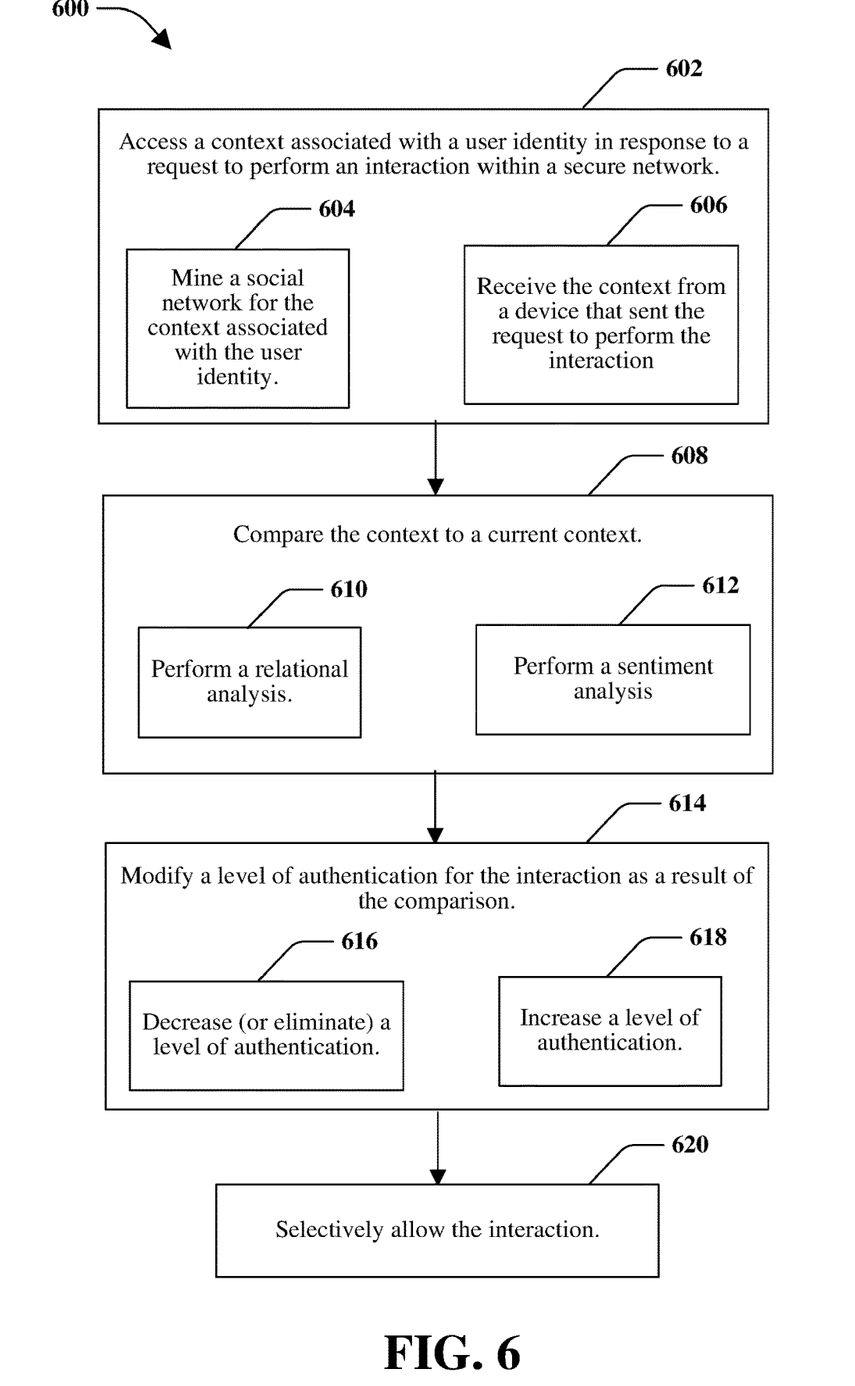
FIG. 6 illustrates an example, non-limiting method configured for enhanced adaptive authentication, according to an aspect.

FIG. 6 illustrates an example, non-limiting method 600 configured for enhanced adaptive authentication, according to an aspect. The method 600 in FIG. 6 may be implemented using, for example, any of the systems, such as the system 200 (of FIG. 2).

Method 600 starts, at 602, when a context associated with a user identity is accessed in response to a request to perform an interaction within a secure network. According to an implementation, accessing the context may include, at 604, mining a social network for the context associated with the user identity. For example, a social network may be identified based on various information related to the user (e.g., one or more email aliases, one or more telephone numbers, a single sign-in across multiple websites, and so on).

In accordance with another implementation, accessing the context may include receiving, at 606, the context from a device that sent the request to perform the interaction. For example, a user may provide a context, which allows the user to be included in the authentication procedure.

At 608, the context is compared with a current context. The current context may be the context determined at substantially the same time as the request to perform the interaction is received. Comparing the contexts may include, at 610, performing a relational analysis. In this case, the context comprises a transactional profile and a behavior profile. Alternatively, or additionally, comparing the context may include, at 612, performing a sentiment analysis. In this case, the context comprises an anticipated activity and an activity performed at substantially the same time as the request to perform the interaction.

The method 600 continues, at 614, and a level of authentication for the interaction is modified as a result of the comparison. For example, the modifying may include decreasing the level of authentication, at 616, based on a determination that the current context conforms to the context. Alternatively, the modifying may include increasing the level of authentication, at 618, based on a determination that the context does not match the current context. At 620, the interaction is selectively allowed based on a result of an authentication.

Figure 7:
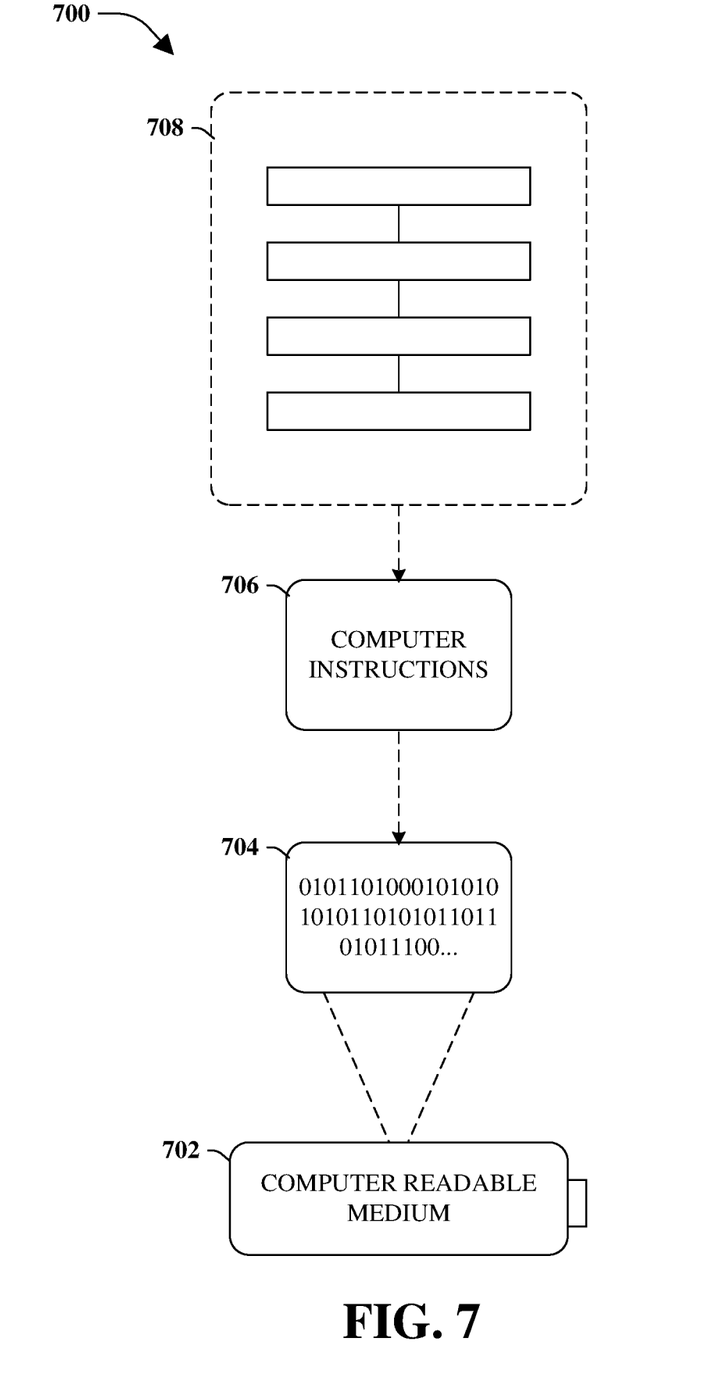
FIG. 7 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 7, wherein an implementation 700 includes a computer-readable medium 702, such as a CD-R, DVD-R, flash drive, a platter of a hard disk drive, and so forth, on which is encoded computer-readable data 704. The computer-readable data 704, such as binary data including a plurality of zero's and one's as illustrated, in turn includes a set of computer instructions 706 configured to operate according to one or more of the principles set forth herein.

In the illustrated embodiment 700, the processor-executable computer instructions 706 may be configured to perform a method 708, such as the method 500 of FIG. 5 and/or the method 600 of FIG. 6, for example. In another embodiment, the processor-executable instructions 704 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
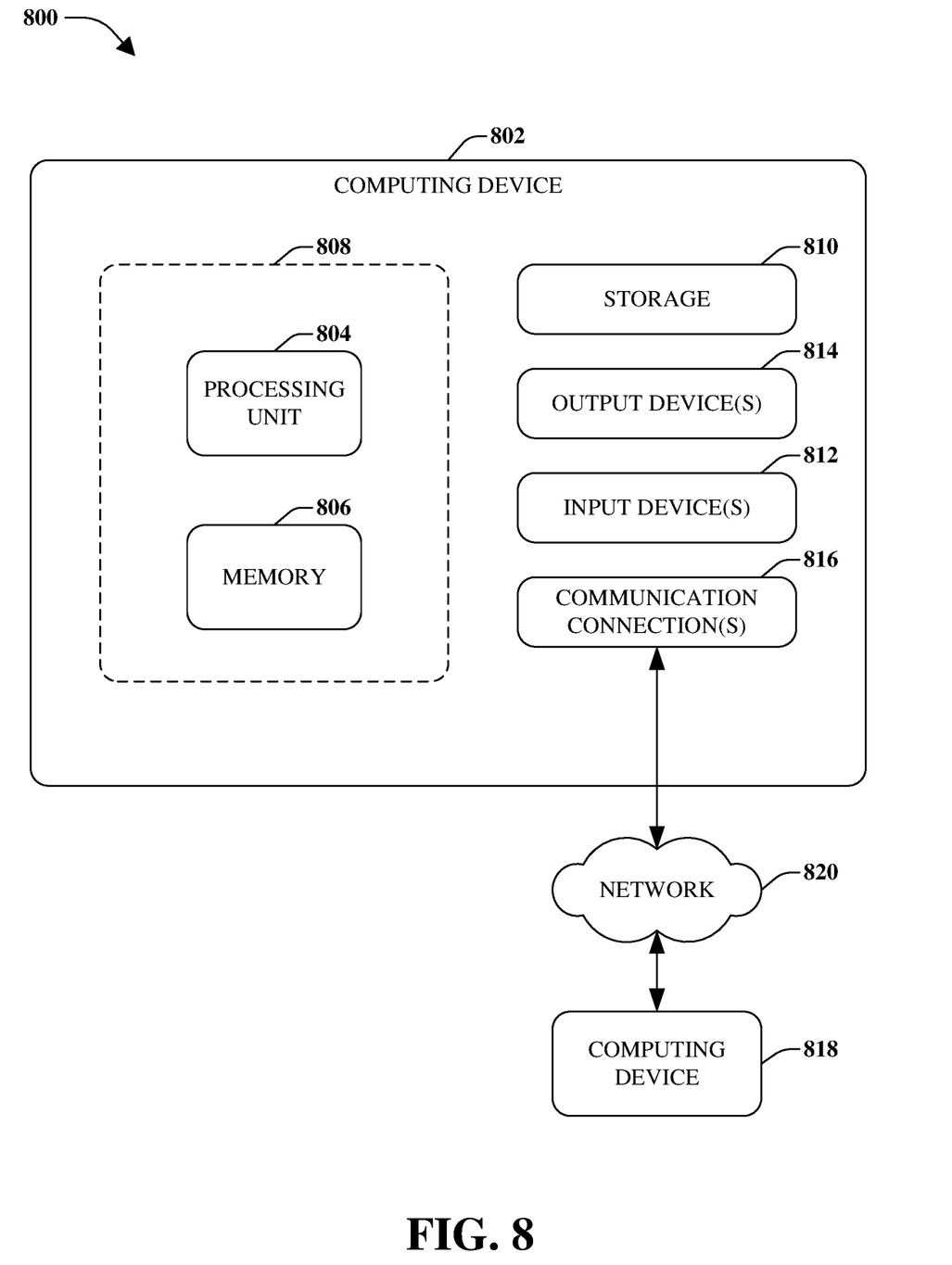
FIG. 8 illustrates an example, non-limiting computing environment where one or more of the aspects set forth herein are implemented, according to one or more embodiments.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 that may include a computing device 802 configured to implement one or more embodiments provided herein. In one configuration, the computing device 802 may include at least one processing unit 804 and at least one memory 806. Depending on the exact configuration and type of computing device, the at least one memory 806 may be volatile, such as RAM, nonvolatile, such as ROM, flash memory, etc., or a combination thereof. This configuration is illustrated in FIG. 8 by dashed line 808.

In other embodiments, the device 802 may include additional features or functionality. For example, the device 802 may include additional storage such as removable storage or non-removable storage, including, but not limited to, magnetic storage, optical storage, etc. Such additional storage is illustrated in FIG. 8 by storage 810. In one or more embodiments, computer readable instructions to implement one or more embodiments provided herein are in the storage 810. The storage 810 may store other computer readable instructions to implement an operating system, an application program, etc. Computer readable instructions may be loaded in the at least one memory 806 for execution by the at least one processing unit 804, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 802 may include input device(s) 812 such as keyboard, mouse, pen, voice input device, touch input device, infrared cameras, video input devices, or any other input device. Output device(s) 814 such as one or more displays, speakers, printers, or any other output device may be included with the device 802. The input device(s) 812 and the output device(s) 814 may be connected to the device 802 via a wired connection, wireless connection, or any combination thereof. In one or more embodiments, an input device or an output device from another computing device may be used as the input device(s) 812 and/or the output device(s) 814 for the device 802. Further, the device 802 may include communication connection(s) 816 to facilitate communications with one or more other devices, illustrated as a computing device 818 coupled over a network 820.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor coupled to a memory that includes instructions that when executed by the processor cause the processor to:
in response to a first successful authentication of a user at an authentication level, infer expected context associated with the user based on mining of social network data, wherein the first successful authentication authorizes limited access to a secure site;
compare current context with the expected context;
modify the authentication level based on a result of the comparison;
initiate at least one additional authentication of the user in accordance with the modified authentication level; and
selectively permit access to a secure resource of the secure site based on a result of the at least one additional authentication at the modified authentication level, wherein access to the secure resource is restricted under the limited access to the secure site authorized by the first successful authentication.

2. The system of claim 1, wherein the instructions further cause the processor to determine the modified authentication level based an extent of difference between the current context and the expected context with respect to a predetermined threshold.

3. The system of claim 1, wherein access to the secure resource is permitted without the at least one additional authentication when a confidence level based on the comparison of the current context and the expected context satisfies a threshold.

4. The system of claim 1, wherein the instructions further cause the processor to:
compare an online activity profile with a behavioral profile of the user when the user interacts with the secure resource; and
determine the modified authentication level based in part on a result of the comparison between the online activity profile and the behavioral profile.

5. The system of claim 1, wherein the expected context is inferred in response to a request to interact with a secure resource.

6. The system of claim 5, wherein the instructions further cause the processor to determine, in real-time, the current context upon receiving the request.

7. The system of claim 5, wherein the secure resource is a network site of a financial institution.

8. The system of claim 7, wherein the request to interact with the secure resource is associated with a monetary transaction.

9. The system of claim 1, wherein the instructions further cause the processor to determine the modified authentication level based on a predetermined policy.

10. A method, comprising:
inferring, by an evaluation manager component of a device comprising a processor and memory, and in response to a first successful authentication of a user at an authentication level, expected context associated with the user based on mining of social network data, wherein the first successful authentication authorizes limited access to a secure site;

comparing, by an authentication manager component of the device, current context with the expected context;

modifying, by the authentication manager component of the device, the authentication level based on a result of the comparison;

initiating, by the authentication manager component of the device, at least one additional authentication of the user in accordance with the modified authentication level; and selectively permitting, by the authentication manager component of the device, access to a secure resource of the secure site based on a result of the at least one additional authentication at the modified authentication level, wherein access to the secure resource is restricted under the limited access to the secure site authorized by the first successful authentication.

11. The method of claim 10, wherein modifying the authentication level comprises increasing the authentication level based on the result of the comparison indicating that the current context and the expected context do not match.

12. The method of claim 10, wherein modifying the authentication level comprises decreasing the authentication level based on the result of the comparison indicating that the current context and the expected context match.

13. The method of claim 10, further comprising bypassing the at least one additional authentication and permitting access to the secure resource when a confidence level based on the comparison of the current context and the expected context satisfies a threshold.

14. The method of claim 10, further comprising receiving a request to interact with the secure resource after the first successful authentication of the user.

15. The method of claim 10, further comprising mining public social network data in real-time.

16. The method of claim 15, further comprising mining non-public social network data.

17. A method of adaptive authentication, comprising:
executing, on a processor, instructions that cause the processor to perform operations comprising:
in response to a first successful authentication of a user at an authentication level, inferring expected context associated with the user based on mining of social network data, wherein the first successful authentication authorizes limited access to a secure site;
comparing current context with the expected context;
modifying the authentication level based on a result of the comparison;
initiating at least one additional authentication of the user in accordance with the modified authentication level; and
selectively permitting access to a secure resource of the secure site based on a result of the at least one additional authentication at the modified authentication level, wherein access to the secure resource is restricted under the limited access to the secure site authorized by the first successful authentication.

18. The method of claim 17, the operations further comprising:
comparing an online activity profile with a behavioral profile of the user when the user interacts with the secure resource; and
determining the modified authentication level based in part on a result of the comparison between the online activity profile and the behavioral profile.

19. The method of claim 17, the operations further comprising determining the modified authentication level based on the result and a predetermined policy.

20. The method of claim 17, the operations further comprising bypassing the at least one additional authentication and permitting access to the secure resource when the current context matches the expected context.

* * * * *